United States Patent [19]

Hartan et al.

[11] Patent Number: 4,618,414
[45] Date of Patent: Oct. 21, 1986

[54] PROCESS FOR SEPARATING MINERAL ULTRA-FINE GRAIN FROM WASHINGS OBTAINED IN COAL PROCESSING OR FROM COAL SLURRIES

[75] Inventors: Hans-Georg Hartan, Kevelaer; Werner Padberg, Dudweiler; Dietrich Müller, Wadgassen, all of Fed. Rep. of Germany

[73] Assignees: Chemische Fabrik Stockhausen GmbH, Krefeld; Saarbergwerke AG, Saarbrucken, both of Fed. Rep. of Germany

[21] Appl. No.: 741,765

[22] Filed: Jun. 6, 1985

Related U.S. Application Data

[63] Continuation of Ser. No. 556,827, Dec. 1, 1983, abandoned.

[30] Foreign Application Priority Data

Dec. 4, 1982 [DE] Fed. Rep. of Germany ....... 3244898

[51] Int. Cl.$^4$ .............................................. B03D 3/06
[52] U.S. Cl. ...................................................... 209/5
[58] Field of Search ............... 209/5, 4, 166; 210/725, 210/698, 733

[56] References Cited

U.S. PATENT DOCUMENTS

| | | | |
|---|---|---|---|
| 3,408,293 | 10/1968 | Dajani et al. | 209/5 |
| 3,418,237 | 12/1968 | Booth et al. | 209/5 |
| 3,717,574 | 2/1973 | Werneke | 209/5 |
| 4,133,747 | 1/1979 | Visman | 209/5 |

FOREIGN PATENT DOCUMENTS 825235 10/1969 Canada ............................... 210/727

Primary Examiner—Bernard Nozick
Attorney, Agent, or Firm—Sprung Horn Kramer & Woods

[57] ABSTRACT

The invention relates to a process for separating mineral finest grain from coal slurries or washings obtained in coal processing, by treating the washing with a selective anionic dispersing agent for the finest grain, having a molecular weight of $\leq 10000$ g/mol, and subsequent selective flocculation of the coal by means of a flocculating agent known per se.

8 Claims, 1 Drawing Figure

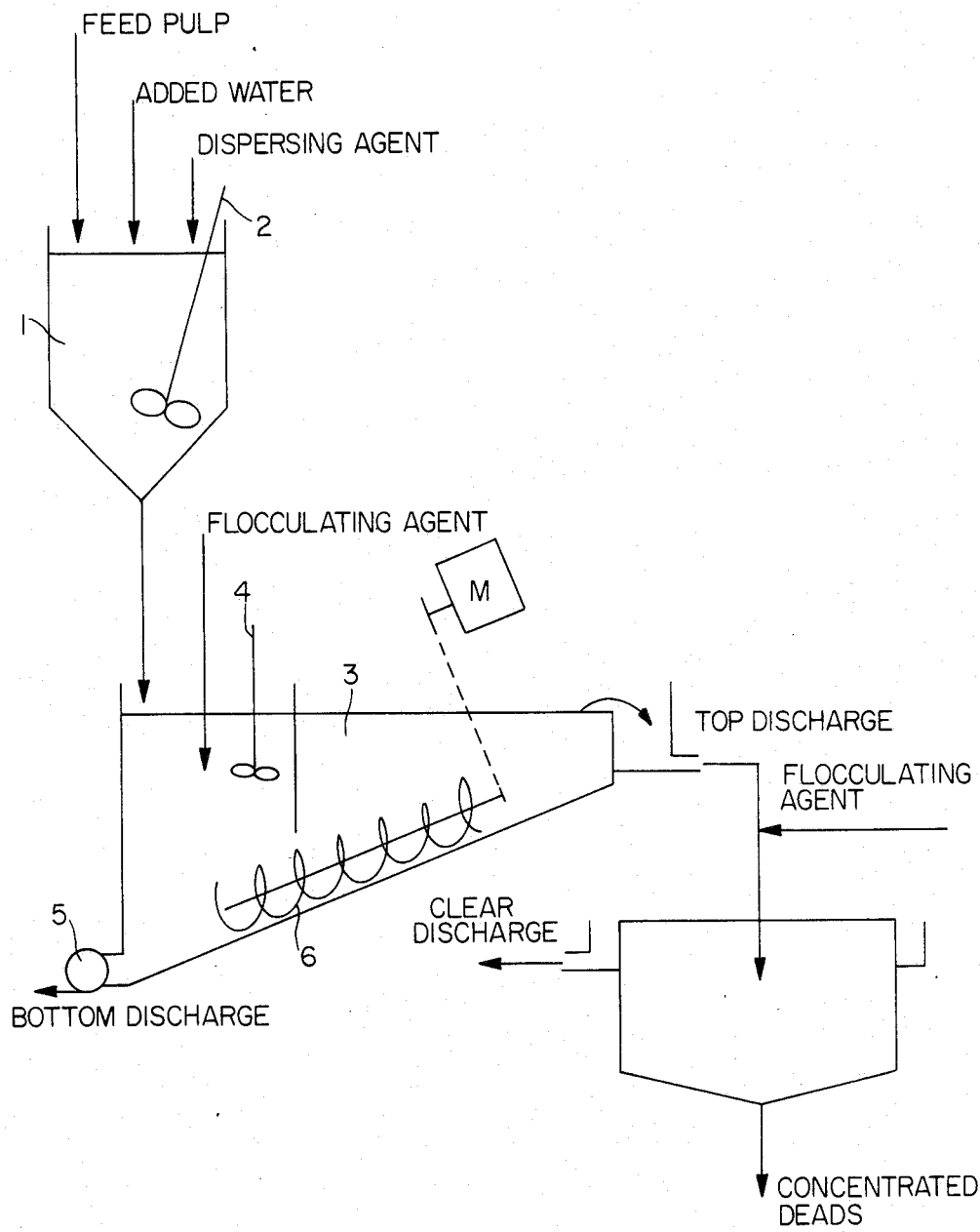

PROCESS FOR SEPARATING MINERAL ULTRA-FINE GRAIN FROM WASHINGS OBTAINED IN COAL PROCESSING OR FROM COAL SLURRIES

This is a continuation of application Ser. No. 556,827, filed Dec. 1, 1983, now abandoned.

The invention relates to a process for separating mineral ultra-fine grain from washings obtained in coal processing or from coal slurries.

BACKGROUND OF THE INVENTION

New working methods in the mining of hard coal and the use of ever larger and more powerful machines in obtaining the coal has resulted in an increase in the finest grain of $\leq 0.5$ mm in the feed for hard coal processing. This set of problems occurs also in the processing of waste tips, which has recently gained considerably in importance. This proportion of finest grain can be far above 20%. Especially problematical and of great consequence for the processing of this finest grain is the increase in the ultra-fine grain of $\leq 5$ $\mu$m which, in turn, may constitute up to 30% of the finest grain. This ultra-fine grain has very high ash contents and consists predominantly of inert mineral components.

The almost colloidal nature of this ultra-fine mineral material hampers the grading of the finest coal which is usually carried out with the acid of flotation. This is reflected in higher consumption of reagents and long residence times in the flotation machines and also in higher ash contents in the flotation concentrate.

The presence of this ultra-fine mineral material poses a considerably greater problem in the dewatering of the flotation concentrate. Owing to the large surface area of the ultra-fine mineral material and also the mineralogical structure, a very great deal of water is retained, as a result of which, especially, the water content of the flotation concentrate is unfavourably influenced. In addition, the mineral material causes great difficulties as a result of blocking the capillaries of the filter cake and the openings in the filter cloth, as a result of which the residual water content of the concentrate frequently cannot be brought below 20%.

Attempts to remove the ultra-fine mineral material either from the raw raised coal or from the finest coal (flotation feed) have hitherto met with little success. Attempts to carry out separation by mechanical means, such as centrifuges or cyclones or by washing or hydrosizing in a gravitational field have probably been frustrated by the fine particles agglomerating, as a result of gravitation or surface-attraction forces, on the coarser particles present in a pulp. This bond is very strong and cannot be broken by mechanical action, for example attrition. Separation methods based on, or decisively influenced by, electrochemical processes are faced with the difficulty that the ultra-fine particles of the finest-grained mineral material which contaminates the coal possess, in the neutral pH range in which coal processing is usually carried out, a high negative surface potential whereas the coal itself has a positive or only a slightly negative potential. This difference in potential between mineral material particles and coal particles results in coagulation of the coal particles with the mineral material particles.

A possible solution to the problem here could be selective flocculation. The object of selective flocculation is to flocculate one component in a pulp containing several mineral components and allow it to sediment whilst the other components remain dispersed. In ore processing and in the processing of mineral slurries processes have also already been proposed for bringing about, with the aid of selectively acting flocculating agents both of inorganic and organic origin, a selective flocculation of the individual components of a pulp (Müller et al., *Erzmetall* 33, 1980, pages 94 to 99). It has not been possible, however, especially in the case of high molecular flocculating agents based on polyelectrolytes, to achieve a high selectivity such that one component is flocculated as quantitatively as possible and can therefore be separated, since an unselective adsorption virtually always occurs owing to non-ionogenic groups and the effect of potential-determining ions in the mineral pulp.

SUMMARY OF THE INVENTION

The object of the invention is, therefore, to provide a process that renders possible in a controlled manner, that is to say selectively, the extensive separation of ultra-fine mineral material from aqueous pulps occurring in coal processing, and especially in hard coal processing, such as washings obtained in hard coal processing.

This object is achieved according to the invention in that the pulp, containing the coal and ultra-fine mineral material (deads) is treated with the aid of a selectively acting dispersing agent based on an anionic, organic, synthetic polymer having a molecular weight of preferably not greater than 10000 before the coal component of the pulp and the coarse mineral material particles are flocculated using a known, preferably anionic, flocculating agent. Surprisingly, by doing this, a very extensive, hitherto-unequalled separation of coal and mineral finest grain contaminating the coal is achieved.

The mineral material particles to be separated from the coal are selectively stabilised in the aqueous dispersion, and for a relatively long period, by the special anionic dispersing agent and thereby rendered insensitive to an unselective adsorption of flocculating agents added later. The flocculating agents then selectively flocculate the non-dispersed coal particles.

The use of high molecular flocculating agents causes the formation of relatively large flocks, so that the necessary separating process, for example sedimentation in a gravitational field, proceeds really rapidly. As a result, the length of time for which the mineral dispersion must be stable is reduced and therewith, inevitably, the amount of dispersing agent that needs to be added.

Given the hitherto-unsatisfactory results of selective flocculation, the success of the process according to the invention, which resides not only in a hitherto-unequalled separation of coal and ultra-fine grain but, at the same time, in the possibility of a continuous procedure, must be considered surprising. A continuously operating process is, in view of the proportion of pulp occurring, an essential requirement for use in coal mining. Furthermore, the process according to the invention offers the advantage of being able to dispense with expensive mechanical apparatus and of requiring only a comparatively small amount of additives, such as dispersing and flocculating agents.

The subject of the invention is, therefore, a process for the separation of finest grain, especially ultra-fine grain, from washings obtained in coal processing or from coal slurries, which is characterised in that the washing or the coal slurry is treated with a dispersing agent, preferably based on an anionic, organic, synthetic polymer, that stably selectively the finest grain and, thereafter, the coal is flocculated selectively by means of a flocculating agent known per se and separated in known manner, preferably by sedimentation.

As selective dispersing agent there is preferably used an anionic product based on an organic, synthetic polymer having a molecular weight of ≦10000 g/mol. The anionicity, that is to say the proportion of anionic units in percent by weight, can vary within wide limits and usually lies between 5 and 100%. The molecular weight of the dispersing agent is vital to the success achieved. At molecular weights of 10,000 the effectiveness falls sharply. Especially good results are obtained with dispersing agents having a molecular weight within the range of from 3000 to 7000. With regard to the effectiveness of the dispersing agent, in addition to molecular weight, naturally, chemical composition also is important. By routine tests, however, the person skilled in the art, having regard to the properties of the feed pulp in question (composition, solids content), can establish the optimum dispersing agent and the optimum molecular weight and the suitable quantity. Suitable dispersing agents are:

1. polyacrylic acid, polymethacrylic acid,
2. copolymers of acrylic acid/acylamide, methacrylic acid/methacrylamide of from 5 to 99% by weight acrylic acid/methacrylic acid,
3. copolymers of acrylic acid/acrylates, for example acrylic acid/isopropyl acrylate (with from 5 to 99% by weight acrylic acid) and salts thereof,
4. poly-2-acrylamido-2-methylpropanesulphonic acid and salts thereof,
5. copolymers of poly-2-acrylamido-2-methylpropanesulphonic acid and salts thereof with acrylamide (with from 5 to 99% by weight AMPA),
6. acrolein polymers,
7. polymaleic acid, copolymers thereof with acrylamide and acrylic acid and salts thereof.

The dispersing agent is advantageously added to the coal pulp while stirring and, optionally, with further dilution with water. Typical washings obtained in coal processing have a solids content of up to 50 g/l.

The quantity of dispersing agent, just as the quantity of flocculating agent used for flocculation, is based on the amount by weight of solids (kg/twf). The quantity of dispersing agent is usually from 0.2 to 1.0 kg/twf.

After the addition of the dispersing agent, the coal is flocculated with a conventional, preferably high molecular, flocculating agent.

Suitable flocculating agents are known. They may be non-ionic or anionic, although, for the purposes of the invention, anionic flocculating agents are preferred. Examples of suitable selective flocculating agents are:
1. high molecular polyacrylamide,
2. high molecular, 5 to 40% by weight anionic, flocculating agent based on partially hydrolysed polyacrylamide.

During the flocculation, the mineral fine grain remains stably dispersed in the supernatant pulp. Only in this way is a genuinely selective flocculation of the coal and an extensive separation of coal and deads at all possible.

The flocculated and sedimented coal is drawn off together with the likewise sedimented coarser mineral particles as the bottom discharge and can be fed to a customary flotation treatment. In the top discharge the dispersed ultra-fine grain is drawn off which, if necessary, can likewise be concentrated by using a suitable flocculating agent. Preferably cationic flocculating agents have proved suitable for this purpose.

BRIEF DESCRIPTION OF THE DRAWING

The drawing is a diagrammatic drawing depicting the process of the present invention.

DETAILED DESCRIPTION OF THE DRAWING

The drawing shows an apparatus for carrying out the process continuously. In the conditioner tank (1), feed pulp, water and dispersing agent are intimately mixed by means of stirrer (2). In the sedimentation tank (3), which is likewise equipped with a stirrer (4), the flocculating agent is metered in. The coal is flocculated and allowed to sediment and is conveyed together with coarser mineral constituents by means of screw conveyor (6) and drawn off as the bottom discharge. The solid in the supernatant pulp consist substantially of ultra-fine grain. The dispersed ultrafine grain can likewise be flocculated by the addition of a suitable flocculating agent.

The invention will be explained by the following Examples.

EXAMPLE 1

To a washing obtained in a hard coal processing operation, having a solids content (TS) of 28 g/l there is added a dispersing agent based on a Na acrylate/acrylamide copolymer (85% Na acrylate, 15% acrylamide; molecular weight approximately 6000 g/mol) in a quantity of 1.8 kg per tonne of solid (=0.5 kg/twf) and the whole is thoroughly mixed. Then, a 40% by weight anionic flocculating agent based on partially hydrolysed polyacrylamide, having a high molecular weight is added in a quantity of 360 g/twf. After sedimentation, 8.3 g/l solid (FS) remain dispersed in the supernatant pulp. The proportion of ash in this solid is 83.7% (experimental quantity of washing used: 250 ml).

EXAMPLE 2

The conditions are identical to those in Example 1 except that there is used as flocculating agent a 30% by weight anionic polymer in a quantity of 90 g/twf. The solids content of the supernatant pulp after sedimentation is 5.1 g/l with an ash content of 95%.

EXAMPLE 3

Under conditions otherwise identical to those in Example 2, there is used as flocculating agent a 40% by weight anionic polymer of the same molecular weight in a quantity of 30 g/twf. The solids content of the supernatant pulp is 11.6 g/l with an ash content of approximately 76%.

EXAMPLE 4

Under conditions otherwise identical to those in Example 1, the process is carried out with a dispersing agent based on a copolymer of 10% Na acrylate and 90% acrylamide, having a molecular weight of approximately 5000 g/mol. Flocculation is carried out with a 30% by weight anionic polymer in a quantity of 180 g/twf. 5.2 g/l solid remain dispersed in the supernatant pulp; the ash content is 89%.

EXAMPLE 5

A washing having a solids content of 55 g/l is treated with the dispersing agent according to Example 1 in a quantity of 455 g/twf; flocculation is carried out with 34 g/twf of a polymer of which 30% by weight is anionic. Dispersed solid: 3.4 g/l; ash 86% (experimental quantity of washing used: 4 liters).

EXAMPLE 6

Under conditions otherwise identical to those in Example 5, the process is carried out with a dispersing agent based on a copolymer of 50% Na acrylate and 50% acrylamide, having a molecular weight of 4000 g/mol. Flocculation is carried out with a polymer of which 30% by weight is anionic. Dispersed solids: 5.4 g/l; ash 86%.

EXAMPLE 7

Under conditions otherwise identical to those in Example 5, there is used as dispersing agent sodium polyhydroxycarboxylate (molecular weight approximately 3800 g/mol). Dispersed solid: 2.0 g/l; ash 89%.

EXAMPLE 8

Under conditions otherwise identical to those in Example 5, there is used as dispersing agent a terpolymer of acrylamide/acrylic acid/AMPA (40/50/10). Dispersed solid: 1.5 g/l; ash 81%.

EXAMPLE 9

To a washing obtained in a waste tip processing operation, having a solids content of 62 g/l and 55% ash there is added a dispersing agent based on a Na acrylate/acrylamide copolymer (85% Na acrylate; 15% acrylamide; molecular weight approximately 6000 g/mol) in a quantity of 500 g/twf and the whole is thoroughly mixed. Then, a 40% by weight anionic flocculating agent is added in a quantity of 15 g/twf. After sedimentation, a solid having an ash content of 81% remains in the supernatant pulp. The proportion of ash in the sediment is 26%.

EXAMPLE 10

Using the apparatus of the drawing, the following trials were conducted:

| Technical specifications: | |
|---|---|
| capacity of sedimentation tank: | 1.8 m³ |
| capacity of conditioner tank: | 0.5 m³ |
| throughput: | 0.4–0.6 m³/h |
| residence time in conditioner tank: | approximately 1 minute |
| residence time in sedimentation tank: | approximately 4.5–3 minutes |
| dispersing agent: | copolymer of 85% acrylic acid/ 15% acrylamide; molecular weight approximately 6000 g/mol |
| flocculating agent: | 30% by weight anionic copolymer having a high molecular weight |

Results:

| | throughput [l/min] | [kgwf/min] | TS [g/l] | ash [%] |
|---|---|---|---|---|
| feed: | 440 | 30.0 | 68 | 49 |
| bottom discharge: | 40 | 21.5 | 537 | 42 |
| top discharge: | 400 | 8.5 | 21 | 66 |

The top discharge containing the finest grain can be clarified by the addition of a further flocculating agent and subsequent sedimentation.

twf = tonnes of solid-containing washing fluid
TS = the solid content with regard to the washing fluid
FS = the solids' content in the supernatant pulp

We claim:

1. In the separation of coal from ash containing mineral material by treating a slurry thereof the improvement which comprises first adding to the slurry a selective dispersing agent for the mineral finest grain, said dispersing agent being an organic, synthetic polymer having a molecular weight of $\leq 10,000$ g/mol and selected from the group consisting of polyacrylic acid, polymethacrylic acid, copolymers of acrylic acid/acrylamide, methacrylic acid/methacrylamide of from 5 to 99% by weight acrylic acid/methacrylic acid, copolymers of acrylic acid/acrylates, poly-2-acrylamido-2-methylpropanesulphonic acid, salts of poly-2-acrylamides-2-methylpropanesulphonic acid, copolymers of poly-2-acrylamido-2-methylpropanesulphonic acid with arylamide and copolymers of salts of poly-2-acrylamido-2-methylpropanesulphonic acid with acrylamide, and acrolein polymers, stirring to disperse the solids, adding an anionic or non-ionic flocculating agent to the dispersion thereby selectively to flocculate the coal and coarser mineral particles while leaving dispersed the ash-containing mineral particles of $\leq 32$ μm separating the flocculated coal and larger mineral particles from the dispersion, the absence of the particles of $\leq 32$ μm resulting in improved subsequent separation.

2. A process according to claim 1, wherein the dispersing agent has an anionicity of from 5 to 100% by weight.

3. A process according to claim 1, carried out continuously.

4. A process according to claim 1, wherein the molecular weight of the dispersing agent is, from 3000 to 7000.

5. A process according to claim 1, wherein the flocculating agent is selected from the group consisting of high molecular polyacrylamide and partially hydrolysed polyacrylamide.

6. A process according to claim 1, which further comprises stirring and diluting during said treating.

7. A process according to claim 1, wherein the flocculating agent is anionic.

8. A process according to claim 1, wherein the flocculating agent is non-ionic.

* * * * *

UNITED STATES PATENT AND TRADEMARK OFFICE
CERTIFICATE OF CORRECTION

PATENT NO. : 4,618,414

DATED : October 21, 1986

INVENTOR(S) : Hans-Georg Hartan, et al.

It is certified that error appears in the above-identified patent and that said Letters Patent are hereby corrected as shown below:

Col. 3, line 2                   After "stably" insert --disperses--

Col. 6, lines 37 and 40      Before "32" delete " $=$ " and substitute -- $\doteq$ --

Signed and Sealed this

Third Day of March, 1987

Attest:

DONALD J. QUIGG

*Attesting Officer*          *Commissioner of Patents and Trademarks*